United States Patent [19]

Suzuki et al.

[11] Patent Number: 4,875,438

[45] Date of Patent: Oct. 24, 1989

[54] METHOD OF CONTROLLING COMPOSITE INTAKE MANIFOLD SYSTEM FOR INTERNAL COMBUSTION ENGINE

[75] Inventors: Shigeru Suzuki, Tokorozawa; Shinichi Shimida, Utsunomiya, both of Japan

[73] Assignee: Honda Giken Kogyo Kabushiki Kaisha, Tokyo, Japan

[21] Appl. No.: 117,695

[22] Filed: Nov. 5, 1987

[30] Foreign Application Priority Data

Nov. 5, 1986 [JP] Japan .................. 61-262031

[51] Int. Cl.⁴ .............................. F02B 3/00
[52] U.S. Cl. .................. 123/52 MB; 123/432; 123/572
[58] Field of Search ........ 123/52 M, 52 MV, 52 MC, 123/52 MB, 308, 572, 568, 432

[56] References Cited

U.S. PATENT DOCUMENTS

| | | | |
|---|---|---|---|
| 4,528,958 | 7/1985 | Yoshida et al. | 123/308 |
| 4,617,897 | 10/1986 | Sasaki et al. | 123/432 |
| 4,643,136 | 2/1987 | Ura et al. | 123/52 M |
| 4,656,991 | 4/1987 | Fukuo et al. | |
| 4,664,076 | 5/1987 | Miyano et al. | |
| 4,669,428 | 6/1987 | Ichida et al. | |
| 4,702,203 | 10/1987 | Ohmi et al. | 123/52 MV |

FOREIGN PATENT DOCUMENTS

| | | | |
|---|---|---|---|
| 0043923 | 3/1984 | Japan | 123/52 M |
| 61-137825 | 8/1986 | Japan . | |
| 61-152758 | 9/1986 | Japan . | |
| 62-59757 | 4/1987 | Japan . | |
| 62-67951 | 4/1987 | Japan . | |
| 62-71366 | 5/1987 | Japan . | |
| 62-84661 | 5/1987 | Japan . | |

Primary Examiner—David A. Okonsky
Attorney, Agent, or Firm—Lyon & Lyon

[57] ABSTRACT

A composite intake manifold system for supplying intake air to an internal combustion engine includes an intake distribution chamber coupled to a throttle valve disposed upstream thereof in a direction in which the intake air flows, longer and shorter intake pipes extending from the intake distribution chamber, bypass valves disposed in the shorter intake pipes, respectively, the longer and shorter intake pipes being joined into intake passages downstream of the bypass valves in the direction of air-flow, the intake passages being adapted to be connected to respective cylinders of the internal combustion engine. The amount of the intake air to flow into the intake distribution chamber is adjusted by the throttle valve. The bypass valves are controlled so as to be selectively fully closed, partly opened, and fully opened according to operating conditions of the internal combustion engine. The bypass valves are fully closed when the internal combustion engine operates in a low speed range, partly opened when the internal combustion engine operates in a medium speed range, and fully opened when the internal combustion engine operates in a high speed range.

15 Claims, 8 Drawing Sheets fig. 1.

FIG. 5a. FULLY CLOSED    FIG. 5b. PARTLY OPEN    FIG. 5c. FULLY OPEN

METHOD OF CONTROLLING COMPOSITE INTAKE MANIFOLD SYSTEM FOR INTERNAL COMBUSTION ENGINE

BACKGROUND OF THE INVENTION

The present invention relates to a method of controlling a composite intake manifold system for use with an internal combustion engine, capable of varying the effective length of intake pipes dependent on the rotational speed of the engine for thereby obtaining an appropriate intake air inertial effect in various engine speed ranges from low to high speed ranges.

There is known an intake manifold system of a variable intake pipe length for use with an internal combustion engine, as disclosed in Japanese Laid-Open Patent Publication No. 61(1986)-4823 corresponding to U.S. Pat. No. 4,664,076. According to the disclosed intake manifold system, the inertial effect of intake air can be adjusted or controlled depenent on the rotational speed of the engine. More specifically, the intake manifold system includes longer intake passages and shorter intake passages having bypass valves therein. As the engine speed increases, the bypass valves in the shorter intake passages are progressively opened to reduce the effective length of intake pipes.

The above bypass valves are controlled by a complex and expensive mechanism comprising a diaphragm actuator controlled by solenoid-operated valves and a step motor. It has not been easy to control the opening of the bypass valves to achieve a high-torque opening setting at all times throughout various engine speed ranges

SUMMARY OF THE INVENTION

It is an object of the present invention to provide a method of controlling a composite intake manifold system for an internal combustion engine by selectively shifting bypass valves to fully-closed, intermediate or partly open, and fully-open positions dependent on the rotational speed of the engine, for providing an appropriate intake air inertial effect to achieve a high and stable engine output capability throughout low-, medium-, and high-speed ranges of the engine According to the present invention, a composite intake manifold system for supplying intake air to an internal combustion engine includes an intake distribution chamber coupled to a throttle valve disposed upstream thereof in a direction in which the intake air flows, longer and shorter intake pipes extending from the intake distribution chamber, bypass valves disposed in the shorter intake pipes, respectively, the longer and shorter intake pipes being joined into intake passages downstream of the bypass valves in the direction of air flow, the intake passages being adapted to be connected to respective cylinders of the internal combustion engine. The amount of the intake air to flow into the intake distribution chamber is adjusted by the throttle valve. The bypass valves are controlled so as to be selectively fully closed, partly opened, and fully opened according to operating conditions of the internal combustion engine. The bypass valves are fully closed when the internal combustion engine operates in a low speed range, partly opened when the internal combustion engine operates in a medium speed range, and fully opened when the internal combustion engine operates in a high speed range.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
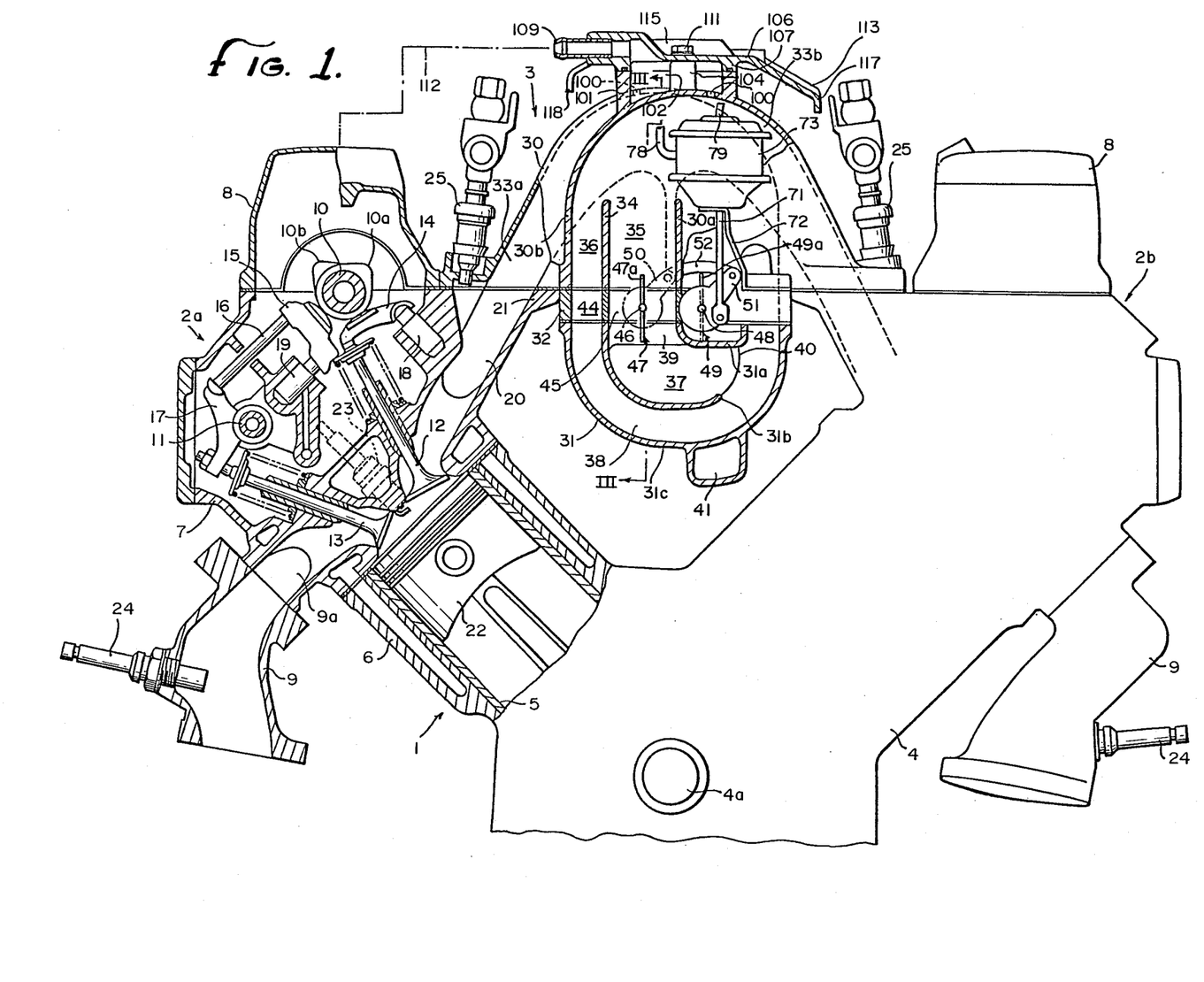
FIG. 1 is a front elevational view, partly in vertical cross section, of an internal combustion engine incorporating a composite intake manifold system.

FIG. 1 shows a V6 internal combustion engine, generally designated by the reference numeral 1, which incorporates therein an intake manifold 3 to be controlled by the present invention. The engine 1 includes two cylinder arrays or banks 2a, 2b of identical construction which are angularly spaced in a V shape, the intake manifold 3 being disposed between the cylinder banks 2a, 2b. The cylinder banks 2a, 2b are integrally joined to each other at their lower ends by a crankcase 4 having a crankshaft 4a. Each of the cylinder banks 2a, 2b comprises a cylinder block 6 having three cylinders 5 (only one shown) mounted therein at spaced intervals along the axis of the crankshaft 4a. The engine also includes a pair of cylinder heads 7 fixed to the upper ends of the cylinder blocks 5, respectively. Each of the cylinder heads 7 has an opening defined in an upper end thereof and closed by a cam cover 8. An exhaust manifold 9 is attached to the outer ends of exhaust ports 9a defined in an outer side of the cylinder head 7.

A camshaft 10 having cams 10a, 10b is rotatably supported in the cylinder head 7 and covered with the cam cover 8, the camshaft 10 being operatively coupled to the crankshaft 4a through timing pulleys and a timing belt (not shown). A rocker arm shaft 11 is also rotatably supported in the cylinder head 7, and intake and exhaust valves 12, 13 are movably disposed in the cylinder head 7. The intake valves 12 are operated by respective rocker arms 14 held in sliding engagement with the cams 10a. The exhaust valves 13 are operated by respective rocker arms 15 held in sliding engagement with the cams 10b through push rods 16 and rocker arms 17 rotatably mounted on the rocker arm shaft 11. The rocker arms 14, 15 have ends supported on lash adjusters 18, 19, respectively, mounted in the cylinder head 7. The cylinder head 7 has intake ports 20 defined in its inner side and includes a flange 21 on its inner side which is connected to the intake manifold 3. Spark plugs 23 (only one shown) are mounted in the cylinder head 7 in coaxially confronting relation to pistons 22 slidably disposed in the respective cylinders 5. $O_2$ sensors 24 are mounted on the respective exhaust manifolds 9 connected to the cylinder banks 2a, 2b. Fuel injection valves 25 are mounted on the intake manifold 3 and directed toward the intake ports 20, respectively.

Figure 2:
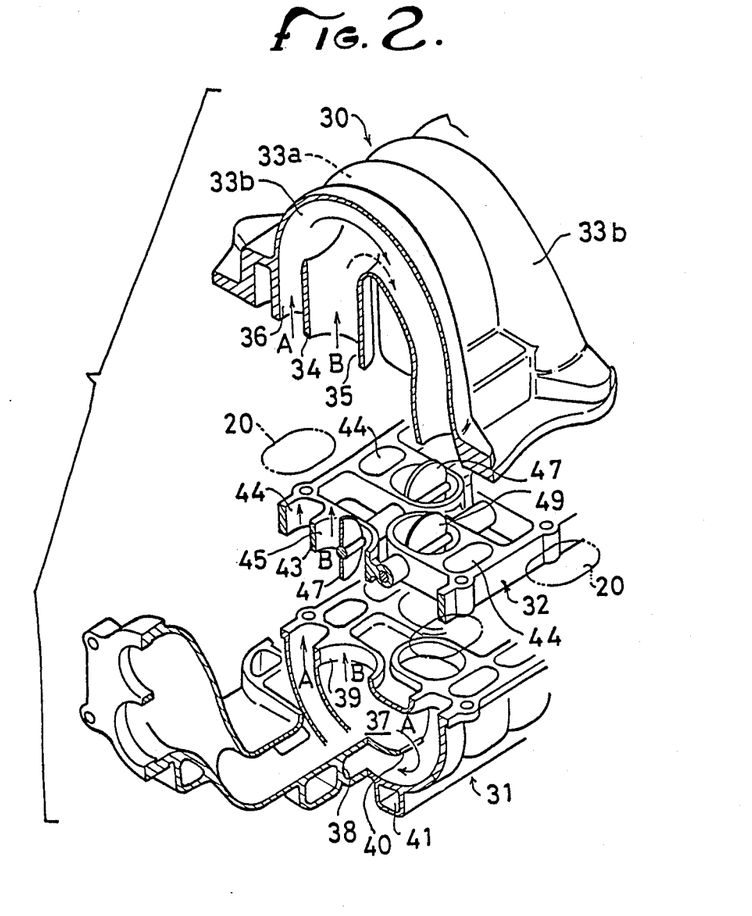
FIG. 2 is an exploded fragmentary perspective view of an intake manifold.
Figure 3:
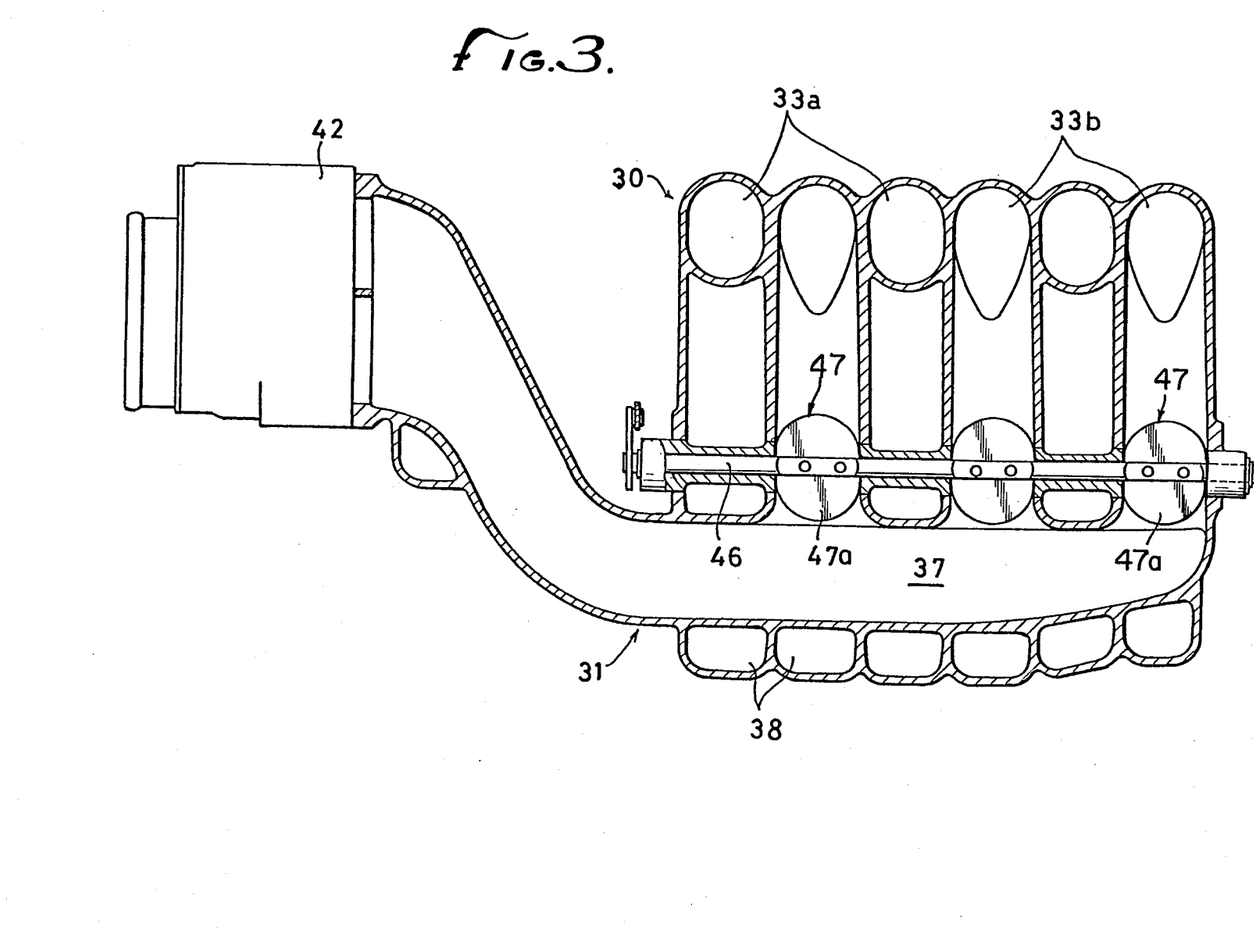
FIG. 3 is a cross-sectional view taken along line III—III of FIG. 1.

As shown in FIGS. 1, 2, and 3, the intake manifold 3 comprises a stacked assembly including an upper member 30, a lower member 31, and an intermediate member 32. The upper member 30 has three inverted V-shaped intake passages 33a leading to the cylinder bank 2a and three inverted V-shaped intake passages 33b leading to the cylinder bank 2b, the intake passages 33a, 33b alternating with each other. The intake passages 33a, 33b have upwardly extending wide portions each divided by a partition 34 into a high-speed passageway 35 and a low-speed passageway 36. The high-speed passageway 35 is defined between the partition 34 and an inner wall 30a, and the low-speed passageway 36 is defined between the partition 34 and an outer wall 30b.

The lower member 31 includes a large-capacity intake distribution chamber 37 defined therein between upper and lower walls 31a, 31b for distributing intake air to all of intake pipes, and six lower arcuate passages 38 defined between the lower wall 31b and an outer wall 31c and extending below the intake distribution chamber 37 and upwardly on one side of the intake distribution chamber 37 in communication with the low-speed passageways 35. The intake distribution chamber 37 has inlet ports 39 communicating with the high-speed passageways 35 and inlet ports 40 communicating with the lower passages 38 remotely from the inlet ports 39. The lower member 31 also has a hot-water riser 41 on the lower wall surfaces of the lower passages 38. The intake distribution chamber 37 is supplied with external air through a throttle body 42 (FIG. 3) housing a throttle valve which adjusts the amount of intake air to be supplied to the intake distribution chamber 37.

The intermediate portion 32 has passages 44 and valve chambers 45 defined therein and divided by partitions 43. The passages 44 are connected between the low-speed passageways 36 and the lower passages 38, and the valve chambers 45 are connected between the high-speed passageways 35 and the inlet ports 39. Three bypass valves 47 comprise a valve shaft 46 extending through the intermedite portion 32 across those valve chambers 45 which lead to the intake passages 33b and three valve plates 47a fixed to the valve shaft 46. Similarly, three bypass valves 49 comprise a valve shaft 48 extending through the intermedite portion 32 across those valve chambers 45 which lead to the intake passages 33a and three valve plates 49a fixed to the valve shaft 48.

When the bypass valves 47, 49 are closed, air flows in the direction of the arrow A from the inlet ports 40 through longer intake pipes comprising the lower passages 38, the passages 44, and the low-speed passages 36 into the intake passages 33a, 33b. When the bypass valves 47, 49 are closed, air flows in the direction of the arrow B from the inlet ports 39 through shorter intake pipes comprising the valve chambers 45 and the high-speed passages 35 into the intake passages 33a, 33b. At this time, the air flow in the direction of the arrow A is substantially stopped.

As shown in FIG. 1, the valve shafts 46, 48 are connected at ends thereof to respective levers 50, 51 that are operatively coupled to each other by a link 52. the levers 50, 51 are normally urged by return springs (not shown) to move in a direction to close the bypass valves 47, 49 for thereby closing the high-speed passageways 35.

The amount of opening of the bypass valves 47, 49 is controlled according to either the rotational speed of the engine 1 or the amount of opening of a throttle valve (not shown). In the illustrated embodiment, the amount of of opening of the bypass valves 47, 49 is controlled according to the rotational speed of the engine 1.

As illustrated in FIG. 1, the lever 51 is coupled to a rod 71 of a vacuum-operated actuator or diaphragm actuator 70. Therefore, the bypass valves 47, 49 can simultaneously be operated by the diaphragm actuator 70 through the rod 71 and the link 52.

Figure 4:
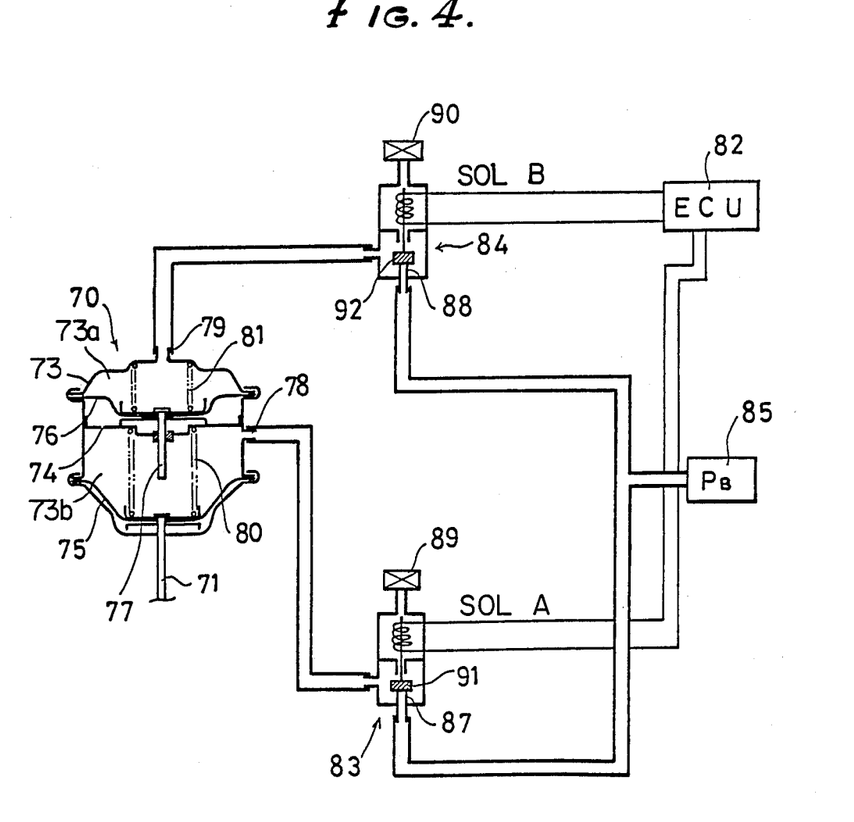
FIG. 4 is a schematic diagram of an electropneumatic arrangement for controlling a diaphragm actuator in the intake manifold.

The diaphragm actuator 70 is supported on the engine 1 by means of a stay 74. As shown in FIG. 4, the diaphragm actuator 70 has a casing 73 divided by a partition 74 into upper and lower chambers 73a, 73b housing therein diaphragms 75, 76 securely attached at their peripheral edges to the casing 73. The lower diaphragm 75 is centrally connected to the rod 71, and the upper diaphragm 76 is connected to a rod-shaped stopper 77 which extends sealingly through the partition 74 in coaxial alignment with the rod 71. The stopper 77 is of such a length that when both of the diaphragms 75, 76 are lowered, as shown in FIG. 4, the lower end of the stopper 77 and the upper end of the rod 71 are spaced a certain distance from each other. The casing 73 has connector pipes 78, 79 for introducing a vacuum to act on the upper surfaces of the diaphragms 75, 76. The spaces below the lower surfaces of the diaphragms 75, 76 are vented to atmosphere.

Springs 80, 81 are disposed in the lower and upper chambers 73b, 73a, respectively, and act on the respective diaphragms 75, 76 for normally urging them to move downwardly. The connector pipes 78, 79 are coupled via respective solenoid-operated valves 83, 84 (SOL A, SOL B) to a vacuum source 85, the solenoid-operated valves 83, 84 being controlled by a central electronic control unit 82. The solenoid-operated valves 83, 84 have respective vacuum inlet ports 87, 88 and respective filters 89, 90. When the solenoid-operated valves 83, 84 are actuated, their valve bodies 91, 92 are lifted to open the vacuum inlet ports 87, 88, allowing a vacuum from the vacuum source 85 to act on the upper surfaces of the diaphragms 75, 76. When the solenoid-operated valves 83, 84 are not actuated, the valve bodies 91, 92 close the respective vacuum inlet ports 87, 88, and the solenoid-operated valves 83, 84 are vented to atmosphere so that atmospheric pressure acts on the upper surfaces of the diaphragms 75, 76, which are displaced downwardly by the springs 80, 81.

Figures 5A, 5B, 5C:
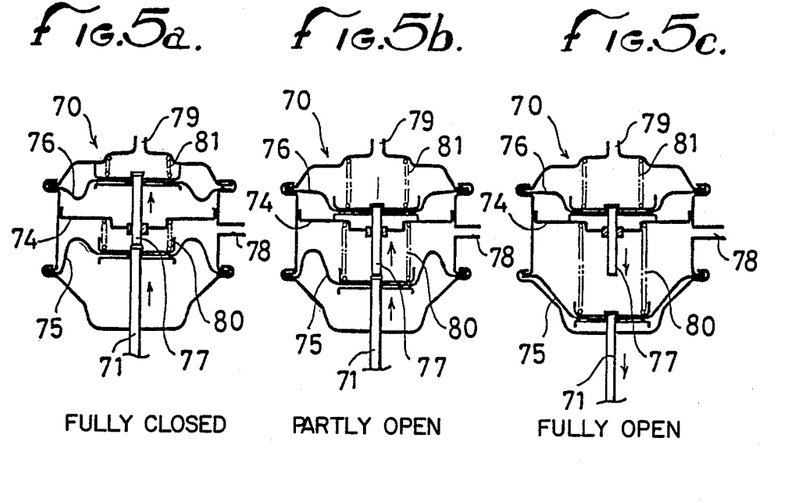
FIGS. 5(a) through 5(c) are cross-sectional views showing how the diaphragm actuator operates.

The diaphragm actuator 70 is controlled by the control unit 82 to take three positions selectively, as shown in FIGS. 5(a), 5(b), and 5(c). When the solenoid-operated valves 83, 84 are actuated, the vacuum inlet ports 87, 88 are opened to connect the diaphragm actuator 70 to the vacuum source 85. The diaphragms 75, 76 are elevated as shown in FIG. 5(a) to lift the rod 71 to its uppermost position for thereby fully closing the bypass valves 47, 49 to provide the longer intake pipes through the intake manifold 3.

When the solenoid-operated valve 84 is vented to atmosphere and the solenoid-operated valve 83 is actuated, the diaphragm 75 is lifted as shown in FIG. 5(b), but stops halfway in its intermediate position by engagement with the stopper 77 which is urged downwardly by the spring 81. Therefore, the bypass valves 47, 49 are partly or half opened, so that air flows through both the low-speed passageways 35 and the high-speed passageways 36.

When both of the solenoid-operated valves 83, 84 are not actuated, the upper surfaces of the diaphragms 75, 76 are subjected to atmospheric pressure, and the diaphragms 75, 76 are urged downwardly under the bias of the springs 80, 81, as shown in FIG. 5(c). The bypass valves 47, 49 are therefore fully opened by the rod 71 to open the high-speed passageways 35, which then provide the shorter intake pipes for passage therethrough of substantially the entire air introduced into the intake manifold 3.

Figure 6:
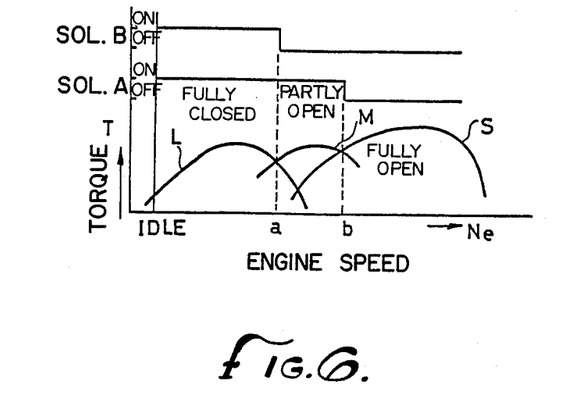
FIG. 6 is a graph showinng an engine output curve obtained by controlling composite intake manifold system according to the present invention.

FIG. 6 shows the relationship between torque T generated by the internal combustion engine 1 and the rotational speed Ne thereof. When intake air flows through the longer intake pipes, a torque vs. speed curve L is obtained, and when intake air flows through the shorter intake pipes, a torque vs. speed curve S is obtained. By partly opening the bypass valves 47, 49 as shown in FIG. 5(b), a torque vs. speed curve M is obtained in a middle speed range between speeds a, b on the curves L, S, in which the torque would otherwise be comparatively low. Therefore, the combination of these three curves L, M, S indicates that the engine can produce high output torque throughout the low-, medium-, and high-speed ranges of the engine 1. As illustrated in FIG. 6, the solenoid-operated valve 84 is turned off at the speed a, and the solenoid-operated valve 83 is turned off at the speed b, so that only the solenoid-operated valve 83 remains turned on in the middle speed range.

Accordingly, air that has passed through the throttle valve is supplied into the cylinders under an appropriate intake air inertial effect in each of the low-, medium-, and high-speed ranges, with the result that the engine can generate a stable torque throughout these speed ranges. The control arrangement comprising the diaphragm actuator, the solenoid-operatd valves, and the control unit is relatively simple in structure, is inexpensive to manufacture, and can be maintained with ease.

Figure 7:
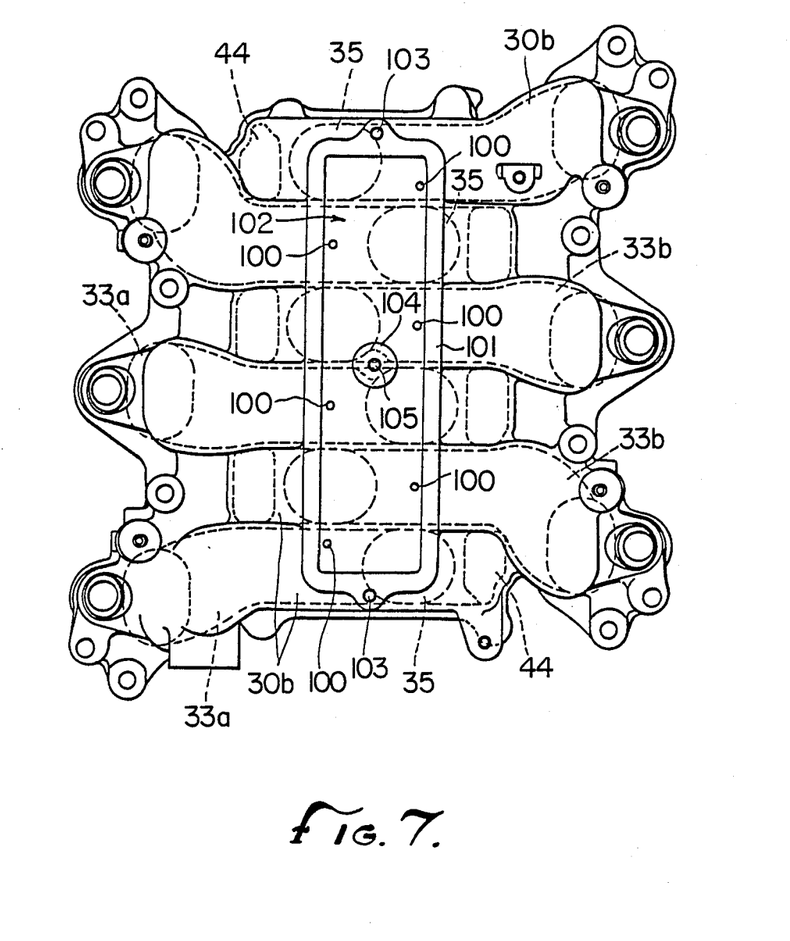
FIG. 7 is a plan view of the intake manifold.

As shown in FIGS. 1 and 7, the intake passages 33a, 33b have curved contiguous outer walls with blowby-gas inlet holes 100 defined .herein at positions slightly displaced from the top portions of the respective intake passages 33a, 33b toward the cylinder banks 2a, 2b, the blowby-gas inlet holes 100 having equal opening areas. Therefore, the blowby-gas inlet holes 100 of the intake passages 33a and the blowby-gas inlet holes 100 of the intake passages 33b are arrayed in respective two rows which are laterally spaced apart from each other. These two rows of the blowby-gas inlet holes 100 are surrounded by an enclosing wall 101 integrally formed on and projecting upwardly from the upper surface of the intake manifold 3. The enclosing wall 101 defines therein a blowby-gas distribution chamber 102, the enclosing wall 101 having screw holes 103. The upper surface of the intake manifold 3 has an upward projection 104 disposed centrally in the blowby-gas distribution chamber 102 with a screw hole 105.

A cover 106 is mounted on the enclosing wall 101. More specifically, as shown in FIGS. 8 through 11, the cover 106 has on its lower surface a surrounding wall 107 with a gasket groove 108 defined in and along its lower surface. The surrounding wall 107 has a shape identical to that of the enclosing wall 101. The cover 106 also has a blow-by gas inlet port 109 defined in a side thereof and a central array of three attachment holes 110 defined perpendicularly to the cover 106. The cover 106 is fastened to the intake manifold 3 by means of screws 111 (FIG. 1) threaded through the attachment holes 110 into the screw holes 103, 105. The blowby-gas inlet port 109 is connected by a return pipe 112 (FIG. 1) to one of the cam covers 8 for introducing blowby gases that have leaked into the crankcase 4, through the cam cover 8.

Figure 8:
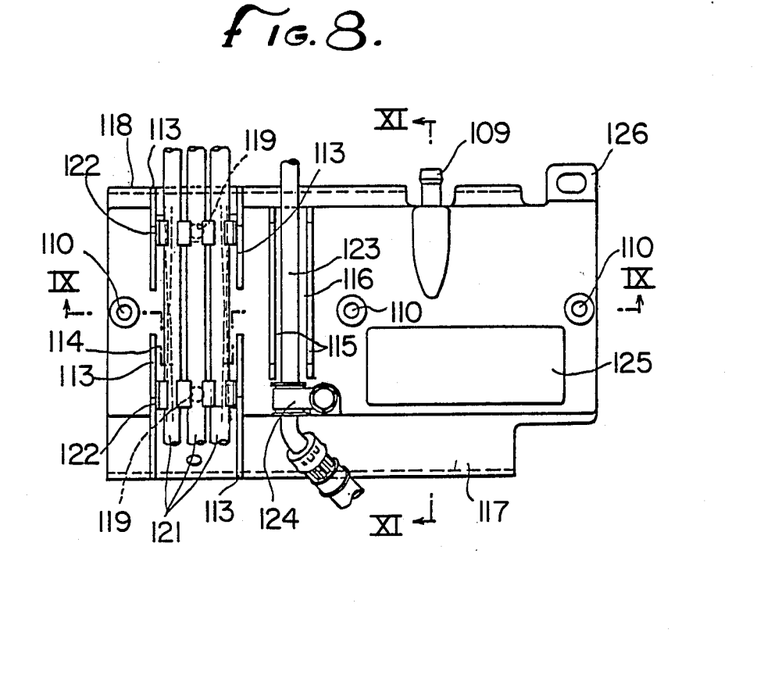
FIG. 8 is plan view of a cover of the intake manifold.
Figure 9:
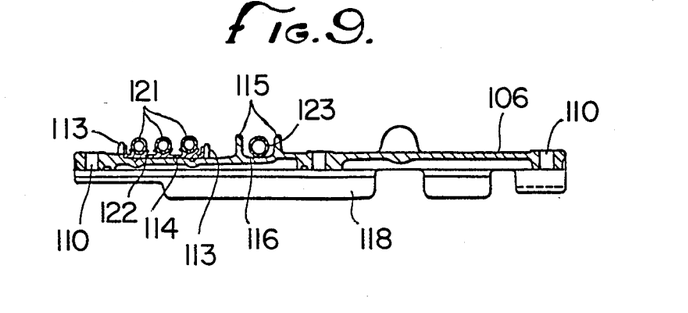
FIG. 9 is a cross-sectional view taken along line IX—IX of FIG. 8.
Figure 10:
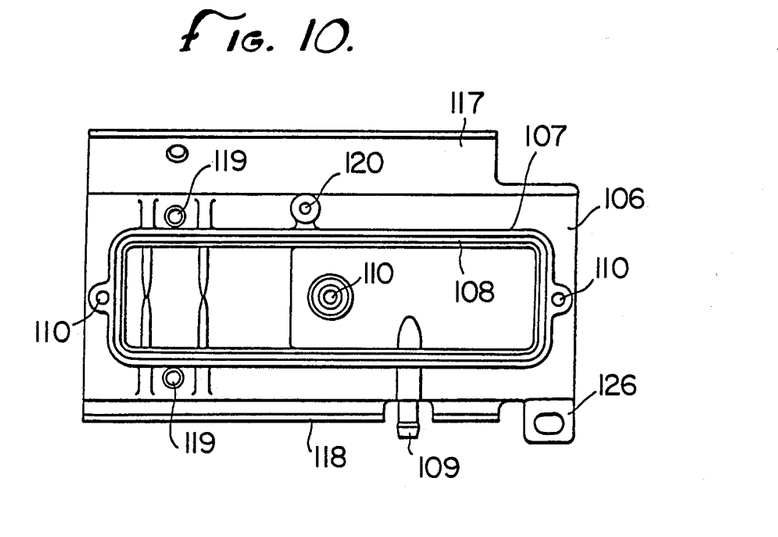
FIG. 10 is a bottom view of the cover.
Figure 11:
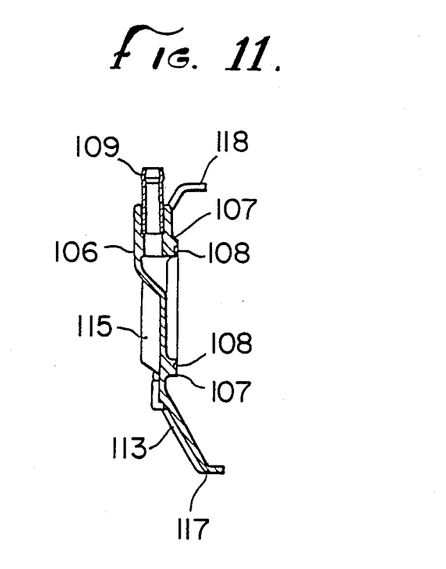
FIG. 11 is a cross-sectional view taken along line XI—XI of FIG. 8.

The cover 106 has on its upper surface two pairs of spaced ridges or protectors 113, the ridges 113 in each pair defining a cord groove 114 therebetween. The cover 106 also has on its upper surface a pair of spaced ridges or protectors 115 defining a pipe groove 116 therebetween. The cover 106 has its longitudinal opposite marginal sides 117, 118 extending obliquely downwardly. Attachment holes 119, 120 are defined in the cover 106 outside of the surrounding wall 107. As shown in FIGS. 8 and 9, high-tension cords 121, three in the illustrated embodiment, which are electrically connected to spark plugs 23, are disposed in the cord grooves 114 and retained therein by means of retainers 122 attached in place by the attachment holes 119. A fuel pipe 123 connected to fuel injection valves 25 is disposed in the pipe groove 116 and retained therein by means of a retainer 124 attached in place by the attachment hole 120. The high-tension cords 121 and the fuel pipe 123 are received on the slanted marginal sides 117, 118 of the cover 106.

The cover 106 also supports an emblem plate 125 on its upper flat surface, and has an integral throttle-cable clamp seat 126 projecting from one side at an end thereof.

Blowby gases flow from the cam cover 8 through the return pipe 112 into the blowby-gas distribution chamber 102, from which the blowby gases are drawn through the inlet holes 100 into the intake passages 33a, 33b and then the engine cylinders 5. Since the blowby-gas distribution chamber 102 on the upper surface of the intake manifold 4 is large in various dimensions, i.e., it may be large in width, length, and height, it presents small resistance to the flow of the blowby gases therethrough, so that the blowby gases can flow out of the respective inlet holes 100 uniformly under the same conditions, allowing the conditions in which the fuel is combusted in the cylinders 5 to remain unchanged by the supplied blowby gasses.

Since the blowby-gas inlet holes 100 are positioned off the top portions of the intake passages 33a, 33b, oil droplets contained in the blowby gases can automatically drop into the intake passages 33a, 33b and then the cylinders 5, without falling into the high- and low-speed passageways 35, 36 where they would otherwise stick to the bypass valves 47, 49 and passage walls.

The high-tension cords 121 and the fuel pipe 123 are supported on the cover 106 and protected by the protector ridges 113, 115 against damage which would otherwise result from contact with an object placed on the cover 106. The emblem plate 125 is clearly visible as it is placed on the upper surface of the cover 106. The cover 106 supports a throttle cable with the throttle-cable clamp seat 126, and may also support other members, if desired, with various supports or seats which may be positioned on the cover 106.

Although a certain preferred embodiment has been shown and described, it should be understood that many changes and modifications may be made therein without departing from the scope of the appended claims.

We claim:

1. A method of controlling a composite intake manifold system for supplying intake air to an internal combustion engine, said composite intake manifold system including an intake distribution chamber coupled to a throttle valve disposed upstream thereof in a direction in which said intake air flows, longer and shorter intake pipes extending from said intake distribution chamber, bypass valves disposed in said shorter intake pipes, respectively, said longer and shorter intake pipes being joined into intake passages downstream of said bypass valves in said direction, said intake passages being adapted to be connected to respective cylinders of the internal combustion engine, said method comprising the steps of:
adjusting the amount of the intake air to flow into said intake distribution chamber with said throttle valve; and
controlling said bypass valves to be selectively fully closed, partly opened, and fully opened according to operating conditions of said internal combustion engine.

2. A method according to claim 1, wherein said bypass valves are fully closed when the internal combustion engine operates in a low speed range, partly opened when the internal combustion engine operates in a medium speed range, and fully opened when the internal combustion engine operates in a high speed range.

3. A method according to claim 1, wherein said bypass valves are controlled according to the amount of opening of said throttle valve.

4. An apparatus for controlling a composite intake manifold system for supplying intake air to cylinders of internal combustion engine, said composite intake manifold system including an intake distribution chamber with a throttle valve disposed upstream thereof in a direction in which said intake air flows, longer and shorter intake pipes extending from said intake distribution chamber, bypass valves disposed in said shorter intake pipes, respectively, said longer and shorter intake pipes being joined into intake passages downstream of said bypass valves in said direction of intake air flow, said intake passages being adapted to be connected to respective cylinders of the internal combustion engine, said apparatus comprising:
means for adjusting the throttle valve for controlling the flow of the intake air into said intake distribution chamber; and
means for controlling said bypass valves to be selectively fully closed, partly opened, and fully opened according to operating conditions of said internal combustion engine.

5. The apparatus according to claim 4, wherein said means for controlling said bypass valves includes means for sensing the speed of the internal combustion engine for causing said bypass valves to be fully closed when the internal combustion engine operates in a low speed range, partly opened when the internal combustion engine operates in a medium speed range, and fully opened when the internal combustion engine operates in a high speed range.

6. The apparatus according to claim 4, wherein said means for controlling said bypass valves includes means for sensing the position of the throttle valve for controlling the position of said bypass valves according to the amount of opening of said throttle valve.

7. A composite intake manifold and control apparatus for supplying intake air to cylinders of an internal combustion engine including, an intake distribution chamber having a throttle valve disposed upstream thereof in a direction in which the intake air flows, longer and shorter intake pipes extending from the intake distribution chamber, a bypass valve disposed in each of the shorter intake pipes, the longer and shorter intake pipes being joined into intake passages downstream of the bypass valves in the direction of intake air flow, each intake passage being adapted to be connected to a respective cylinder of the internal combustion engine, a throttle valve for selectively controlling the flow of intake air into the intake distribution chamber, and means for selectively controlling the bypass valves to at least fully closed, partly opened, and fully opened positions according to operating conditions of the internal combustion engine.

8. The apparatus according to claim 7, wherein said means for selectively controlling the bypass valves includes means for sensing the engine speed for causing said bypass valves to be positioned fully open at high engine speeds, partly open at medium engine speeds, and fully closed at low engine speeds.

9. The apparatus according to claim 7, wherein said mean for selectively controlling the bypass valves includes means for responding to the position of the throttle valve for causing selective control of said bypass valves.

10. A composite intake manifold and control apparatus for supplying intake air to cylinders of an internal combustion engine including, an intake distribution chamber having a throttle valve disposed upstream thereof in a direction in which the intake air flows, longer and shorter intake pipes extending from the intake distribution chamber, a bypass valve disposed in each of the shorter intake pipes, the longer and shorter intake pipes being joined into intake passages downstream of the bypass valves in the direction of intake air flow, each intake passage being adapted to be connected to a respective cylinder of the internal combustion engine, a throttle valve for selectively controlling the flow of intake air into the intake distribution chamber, and means for selectively controlling the bypass valves to at least fully closed, partly opened, and fully opened positions according to operating conditions of the internal combustion engine, wherein said means for selectively controlling the bypass valves includes an actuator with link means connected to the bypass valves, said actuator including a pair of diaphragms with means connected to said link means, two tubes connected between said actuator and the engine intake for imposing a vacuum on the actuator, the two tubes connected to separated locations on the actuator for causing separate movement of the diaphragms to thereby cause different movement of said link means, and a separate vacuum valve in each tube selectively operable for opening both vacuum valves, closing both vacuum valves, or opening one vacuum valve and closing the other vacuum valve to cause the selective control of the bypass valves to the three positions.

11. The apparatus according to claim 10, wherein said means for selectively controlling the bypass valves includes an electronic control unit with means for sensing and responding to operating conditions of the engine, and said vacuum valves being operated by said electronic control unit.

12. A composite intake manifold and control apparatus for supplying intake air to cylinders of an internal combustion engine including, an intake distribution chamber having a throttle valve disposed upstream thereof in a direction in which the intake air flows, longer and shorter intake pipes extending from the intake distribution chamber, a bypass valve disposed in each of the shorter intake pipes, the longer and shorter intake pipes being joined into intake passages downstream of the bypass valves in the direction of intake air flow each intake passage being adapted to be connected to a respective cylinder of the internal combustion engine, a throttle valve for selectively controlling the flow of intake air into the intake distribution chamber, and means for selectively controlling the bypass valves to at least fully closed, partly opened, and fully opened positions according to operating conditions of the internal combustion engine, wherein a blowby-gas distribution chamber is provided above said intake passages, means connecting the blowby-gas distribution chamber to a valve-operating portion of the engine for drawing blowby-gas from said portion, and inlet means connecting said blowby-gas distribution chamber to at least one of said intake passages for drawing the blowby-gas from the distribution chamber into the engine cylinders.

13. The apparatus according to claim 12, wherein said inlet means comprises an inlet hole from each intake passage into substantially lowermost locations in the blowby-gas distribution chamber.

14. A composite intake manifold apparatus for supplying intake air to cylinders of an internal combustion engine including, an intake distribution chamber, longer and shorter intake pipes extending from said intake distribution chamber, a bypass valve disposed in each said shorter intake pipe, said longer and shorter intake pipes being joined into intake passages downstream of said bypass valves in the direction of intake air flow, said intake passages being adapted to be connected to respective cylinders of the internal combustion engine, a blowby-gas distribution chamber located above said intake passages, means connecting said blowby-gas distribution chamber to a portion of the engine receiving blowby-gas, and inlet means connecting said blowby-gas distribution chamber to at least one of said intake passages for drawing blowby-gas through the blowby-gas distribution chamber and inlet means into the engine cylinders.

15. The apparatus of claim 14, wherein said inlet means comprises an inlet hole from each intake passage into the blowby-gas chamber.

* * * * *